(12) United States Patent
Wittmer et al.

(10) Patent No.: US 7,343,315 B2
(45) Date of Patent: Mar. 11, 2008

(54) SYSTEM AND METHOD OF EFFICIENT SCHEDULING AND PROCESSING OF PURCHASE ORDERS

(75) Inventors: Holger Wittmer, Riegelsberg (DE); Andreas Freitag, Saarbrücken (DE)

(73) Assignee: SAP Aktiengesellschaft, Walldorf (DE)

( * ) Notice: Subject to any disclaimer, the term of this patent is extended or adjusted under 35 U.S.C. 154(b) by 602 days.

(21) Appl. No.: 10/914,614

(22) Filed: Aug. 9, 2004

(65) Prior Publication Data

US 2005/0197912 A1 Sep. 8, 2005

Related U.S. Application Data

(60) Provisional application No. 60/551,221, filed on Mar. 8, 2004, provisional application No. 60/563,284, filed on Apr. 16, 2004.

(51) Int. Cl.
*G06Q 10/00* (2006.01)
*G06Q 30/00* (2006.01)

(52) U.S. Cl. .................... 705/8; 705/29; 705/26

(58) Field of Classification Search ............ 705/8, 705/26, 27, 29
See application file for complete search history.

(56) References Cited

U.S. PATENT DOCUMENTS

| | | | |
|---|---|---|---|
| 5,400,253 A | | 3/1995 | O'Connor |
| 5,615,109 A | * | 3/1997 | Eder ............................ 705/8 |
| 5,870,716 A | * | 2/1999 | Sugiyama et al. ............ 705/26 |
| 5,930,771 A | | 7/1999 | Stapp |
| 6,341,351 B1 | * | 1/2002 | Muralidhran et al. .......... 726/9 |
| 6,505,093 B1 | * | 1/2003 | Thatcher et al. ............ 700/216 |
| 6,507,851 B1 | | 1/2003 | Fujiwara et al. |
| 6,701,299 B2 | * | 3/2004 | Kraisser et al. ................ 705/8 |
| 6,910,017 B1 | | 6/2005 | Woo et al. |
| 6,980,966 B1 | | 12/2005 | Sobrado et al. |
| 7,092,929 B1 | | 8/2006 | Dvorak et al. |
| 7,117,165 B1 | | 10/2006 | Adams et al. |
| 7,139,731 B1 | | 11/2006 | Alvin |
| 2002/0023500 A1 | | 2/2002 | Chikuan et al. |
| 2002/0078159 A1 | | 6/2002 | Petrogiannis et al. |

(Continued)

FOREIGN PATENT DOCUMENTS

JP 2004030343 A 1/2004

(Continued)

OTHER PUBLICATIONS

Anon., "(A Lot of) Life After H. Ross: Electronic Data Systems," Financial World, vol. 162, No. 22, p. 50, Nov. 9, 1993.*

(Continued)

*Primary Examiner*—Nicholas D. Rosen
(74) *Attorney, Agent, or Firm*—Foley & Lardner LLP

(57) ABSTRACT

Methods and system for scheduling purchase orders are disclosed. The method includes defining a purchasing order for a delivery period, the purchase order having two or more items, and the delivery period corresponding to two or more order periods. The method also includes determining a latest order period for each item to satisfy a pre-determined lead time between order placement and delivery for delivery in the delivery period, and assigning each item to one of the order periods. At least one item in the purchase order is assigned to a latest order period of the at least one item.

17 Claims, 10 Drawing Sheets

U.S. PATENT DOCUMENTS

| | | | |
|---|---|---|---|
| 2002/0107713 A1 | 8/2002 | Hawkins | |
| 2002/0147668 A1 | 10/2002 | Smith et al. | |
| 2002/0152128 A1* | 10/2002 | Walch et al. | 705/26 |
| 2003/0023500 A1 | 1/2003 | Boies et al. | |
| 2003/0028437 A1 | 2/2003 | Grant et al. | |
| 2003/0046195 A1 | 3/2003 | Mao | |
| 2003/0149631 A1* | 8/2003 | Crampton et al. | 705/22 |
| 2003/0158791 A1 | 8/2003 | Gilberto et al. | |
| 2003/0171998 A1 | 9/2003 | Pujar et al. | |
| 2003/0172007 A1 | 9/2003 | Helmolt et al. | |
| 2003/0200150 A1* | 10/2003 | Westcott et al. | 705/26 |
| 2003/0229502 A1 | 12/2003 | Woo | |
| 2004/0098358 A1 | 5/2004 | Roediger | |
| 2004/0162763 A1 | 8/2004 | Hoskin et al. | |
| 2004/0186783 A1 | 9/2004 | Knight et al. | |
| 2004/0210489 A1 | 10/2004 | Jackson et al. | |
| 2004/0220861 A1 | 11/2004 | Morciniec et al. | |
| 2005/0055283 A1 | 3/2005 | Zarovinsky | |
| 2005/0060270 A1 | 3/2005 | Ramakrishnan | |
| 2005/0086122 A1 | 4/2005 | Cirulli et al. | |
| 2005/0096963 A1 | 5/2005 | Myr et al. | |
| 2005/0102192 A1 | 5/2005 | Gerrits et al. | |
| 2005/0102227 A1 | 5/2005 | Solonchev | |
| 2005/0165659 A1 | 7/2005 | Gruber | |
| 2005/0171825 A1* | 8/2005 | Denton et al. | 705/8 |
| 2006/0036507 A1 | 2/2006 | Pujar et al. | |

FOREIGN PATENT DOCUMENTS

| | | | |
|---|---|---|---|
| WO | WO-9945450 A2 * | 9/1999 | |

OTHER PUBLICATIONS

Brown, T.C., "The Effects of Assortment Composition Flexibility on Operating Efficiency" (Abstract only), Dissertation Abstracts International, vol. 55/08-A, p. 2458.*

Wilson, G.T., "Changing the Process of Production," Industrial Management, vol. 37, No. 1, pp. 1-2, Jan./Feb. 1995.*

Melcer, R., "Local Tech Firm Creates Retail Markdown Tool," Mar. 24, 2000, Cincinnati Business Courier.*

U.S. Appl. No. 60/374,892, filed Apr. 22, 2002, Russell Krajec.

Author unknown, "Staffware: Staffware And Biomni Join Forces To Provide End-To-End E-Procurement Solution With Enhanced Workflow Capability: Self-Service Functionality Will Enable Thousands Of Transactions To Be Handled Daily From The Desktop," *MS Presswire*, Coventry, Feb. 6, 2001 (p. 1.).

"Beyond Markdown Management", summer/autumn 03, *the 4caster*, Iss. 4, vol. 2.

Melcer, Rachel, "Local tech firm creates retail markdown tool", Mar. 24, 2000, *Cincinnati Business Courier* (3 pgs.).

Profitlogic, available at http://web.archive.org/web/2002060311838/http://profitlogic.com/, available at least by Apr. 15, 2005 (22 pp.).

"Retailers Manage Markdown Challenges Using i2 Solutions", Jan. 13, 2003, NFR 92nd Annual Convention & Expo (2 pgs.).

Subrahmanyan et al., "Developing optimal pricing and inventory policies for retailers who face uncertain demand", *Journal of Retailing*, vol. 72, No. 1, Spring, 1996 (p. 7(24)).

* cited by examiner

PURCHASE ORDER
DELIVERY PERIOD: AUGUST

| ITEM | QUANTITY | COST | REQUIRED LEAD TIME |
|---|---|---|---|
| Article 1 | 1000 | 12000 | 2 months |
| Article 2 | 3500 | 17500 | 5 months |
| Article 3 | 200 | 5000 | 3 months |
| Article 4 | 35 | 7000 | 3 months |
| Article 5 | 800 | 20000 | 4 months |
| Article 6 | 1300 | 5200 | 1 month |
| Article 7 | 4000 | 32000 | 5 months |
| Article 8 | 6600 | 3300 | 0 months |
| Article 9 | 600 | 18000 | 0 months |
| Article 10 | 2500 | 40000 | 1 month |
| Article 11 | 500 | 6000 | 4 months |
| Article 12 | 1700 | 6800 | 3 months |
| Article 13 | 100 | 2500 | 3 months |
| Article 14 | 25 | 5000 | 5 months |
| Article 15 | 400 | 10000 | 2 months |
| Article 16 | 800 | 3200 | 1 month |
| Article 17 | 2000 | 16000 | 0 months |
| Article 18 | 3000 | 7500 | 5 months |
| Article 19 | 300 | 9000 | 1 month |
| Article 20 | 1500 | 24000 | 4 months |

FIG. 6

PURCHASE ORDER
DELIVERY PERIOD: AUGUST

| ITEM | QUANTITY | COST | REQUIRED LEAD TIME | REQUIRED ORDER PERIOD |
|---|---|---|---|---|
| Article 2 | 3500 | 17500 | 5 months | March |
| Article 7 | 4000 | 32000 | 5 months | March |
| Article 14 | 25 | 5000 | 5 months | March |
| Article 18 | 3000 | 7500 | 5 months | March |
| Article 5 | 800 | 20000 | 4 months | April |
| Article 11 | 500 | 6000 | 4 months | April |
| Article 20 | 1500 | 24000 | 4 months | April |
| Article 3 | 200 | 5000 | 3 months | May |
| Article 4 | 35 | 7000 | 3 months | May |
| Article 12 | 1700 | 6800 | 3 months | May |
| Article 13 | 100 | 2500 | 3 months | May |
| Article 1 | 1000 | 12000 | 2 months | June |
| Article 15 | 400 | 10000 | 2 months | June |
| Article 6 | 1300 | 5200 | 1 month | July |
| Article 10 | 2500 | 40000 | 1 month | July |
| Article 16 | 800 | 3200 | 1 month | July |
| Article 19 | 300 | 9000 | 1 month | July |
| Article 8 | 6600 | 3300 | 0 months | August |
| Article 9 | 600 | 18000 | 0 months | August |
| Article 17 | 2000 | 16000 | 0 months | August |

FIG. 7

BUDGET
DELIVERY PERIOD: AUGUST

| ORDER PERIOD | REQUIRED BUDGET |
|---|---|
| March | 62,000 |
| April | 50,000 |
| May | 21,300 |
| June | 22,000 |
| July | 57,400 |
| August | 37,300 |

FIG. 8

SYSTEM AND METHOD OF EFFICIENT SCHEDULING AND PROCESSING OF PURCHASE ORDERS

CROSS-REFERENCE TO RELATED PATENT APPLICATIONS

This application claims the benefit of U.S. Provisional Application No. 60/551,221, filed Mar. 8, 2004 and entitled "Inventory Management," and U.S. Provisional Application No. 60/563,284, filed Apr. 16, 2004 and entitled "Inventory Management," both of which are hereby incorporated by reference.

BACKGROUND OF THE INVENTION

The present invention relates generally to the field of systems for and methods of processing purchase orders. More particularly, the present invention relates to systems for and methods of efficient scheduling and processing of purchase orders.

One particular business that processes purchase orders is the retail business. Operations for a business often include purchasing merchandise from a supplier for sale to customers or for use in the processes and products for the business. Generally, purchasing merchandise or supplies from the supplier involves sending a purchase order to the supplier requesting a specific number of items for a specific price. The number of items multiplied by the price of the items provides a total cost associated with the purchase order. Prior to sending the purchase order, the purchase order may need to be approved by an entity, such as a budgeting department. The entity may apply one or more rules to the purchase order in determining whether to approve the purchase order. For example, a rule may dictate that the approval is granted or denied based on whether incurring the total cost of the purchase order is acceptable in view of budget constraints. Accordingly, the purchase order is approved or rejected based on budget constraints prior to being sent to the supplier.

The retail business can require that certain purchase orders be processed in a very short amount of time, while other purchase orders must be placed well in advance of the desired delivery. For example, changes in current trends in the fashion industry may require that inventory be increased on short notice. For certain aspects of the fashion industry, items may be required to be ordered one or more seasons in advance. An advantageous purchase order system must accommodate this variation in lead times of the ordered items without unnecessarily tying up funds.

Each purchase order may include numerous items that are desired at a particular delivery period. In order to ensure timely delivery, the purchase order may be placed well in advance of the desired delivery period. Typically, funds from the budget corresponding to the purchase order require binding at the time the purchase order is placed. Binding of the funds at this early stage may result in detrimental cash flow or other financial shortcomings. Accordingly, it is desirable to delay binding of the funds as late as possible.

SUMMARY OF THE INVENTION

One embodiment of the invention relates to a method of scheduling a purchase order. The method includes defining a purchasing order for a delivery period, the purchase order having two or more items, and the delivery period corresponding to two or more order periods. The method also includes determining a latest order period for each item to satisfy a pre-determined lead time between order placement and delivery for delivery in the delivery period, and assigning each item to one of the order periods. At least one item in the purchase order is assigned to a latest order period of the at least one item.

Another embodiment of the invention relates to a program product for scheduling purchase orders. The program product includes machine-readable program code for causing, when executed, one or more machines to perform the following method steps: defining a purchasing order for a delivery period, the purchase order having two or more items, the delivery period corresponding to two or more order periods, determining a latest order period for each item to satisfy a pre-determined lead time between order placement and delivery for delivery in the delivery period, and assigning each item to one of said order periods, at least one item in said purchase order being assigned to a latest order period of said at least one item.

Another embodiment of the invention relates to a method of scheduling purchase orders. The method includes: a) receiving a purchase order for a delivery period, the delivery period corresponding to two or more order periods, the purchase order including two or more items, each item having a predetermined lead time between order placement and delivery, b) determining whether an item has a lead time requiring inclusion of the item in a sub-order corresponding to current order period, c) including the item in the sub-order corresponding to current order period when step c) results in an affirmative determination, and d) repeating steps b) and c) for all items in the purchase order.

Other features and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many modifications and changes within the scope of the present invention may be made without departing from the spirit thereof, and the invention includes all such modifications.

BRIEF DESCRIPTION OF THE DRAWINGS

The exemplary embodiments will hereafter be described with reference to the accompanying drawings, wherein like numerals depict like elements, and:

FIG. 6 is a chart illustrating an exemplary purchase order;

FIG. 7 is a chart illustrating the purchase order of FIG. 6 after sorting;

FIG. 8 is a chart illustrating the an exemplary budget allocation for the purchase order of FIGS. 6 and 7;

DETAILED DESCRIPTION OF THE PREFERRED EMBODIMENTS

In the following description, for the purposes of explanation, numerous specific details are set forth in order to provide a thorough understanding of the present invention. It will be evident to one skilled in the art, however, that the exemplary embodiments may be practiced without these specific details. In other instances, structures and device are shown in diagram form in order to facilitate description of the exemplary embodiments.

The disclosed embodiments provide systems and methods for scheduling a purchase order which reduces or minimizes the length of time that funds are tied up. In the disclosed embodiments, one or more items in a purchase order are scheduled for ordering based on an expected lead time. Using the lead time, a latest order period can be determined to include those items in the desired delivery period. Thus, the binding of funds is delayed until the latest order period determined for particular items.

In at least one exemplary embodiment illustrated below, a computer system is described which has a central processing unit (CPU) that executes sequences of instructions contained in a memory. More specifically, execution of the sequences of instructions causes the CPU to perform steps, which are described below. The instructions may be loaded into a random access memory (RAM) for execution by the CPU from a read-only memory (ROM), a mass storage device, or some other persistent storage. In other embodiments, multiple workstations, databases, process, or computers can be utilized. In yet other embodiments, hardwired circuitry may be used in place of, or in combination with, software instructions to implement the functions described. Thus, the embodiments described herein are not limited to any particular source for the instructions executed by the computer system.

Figure 1:
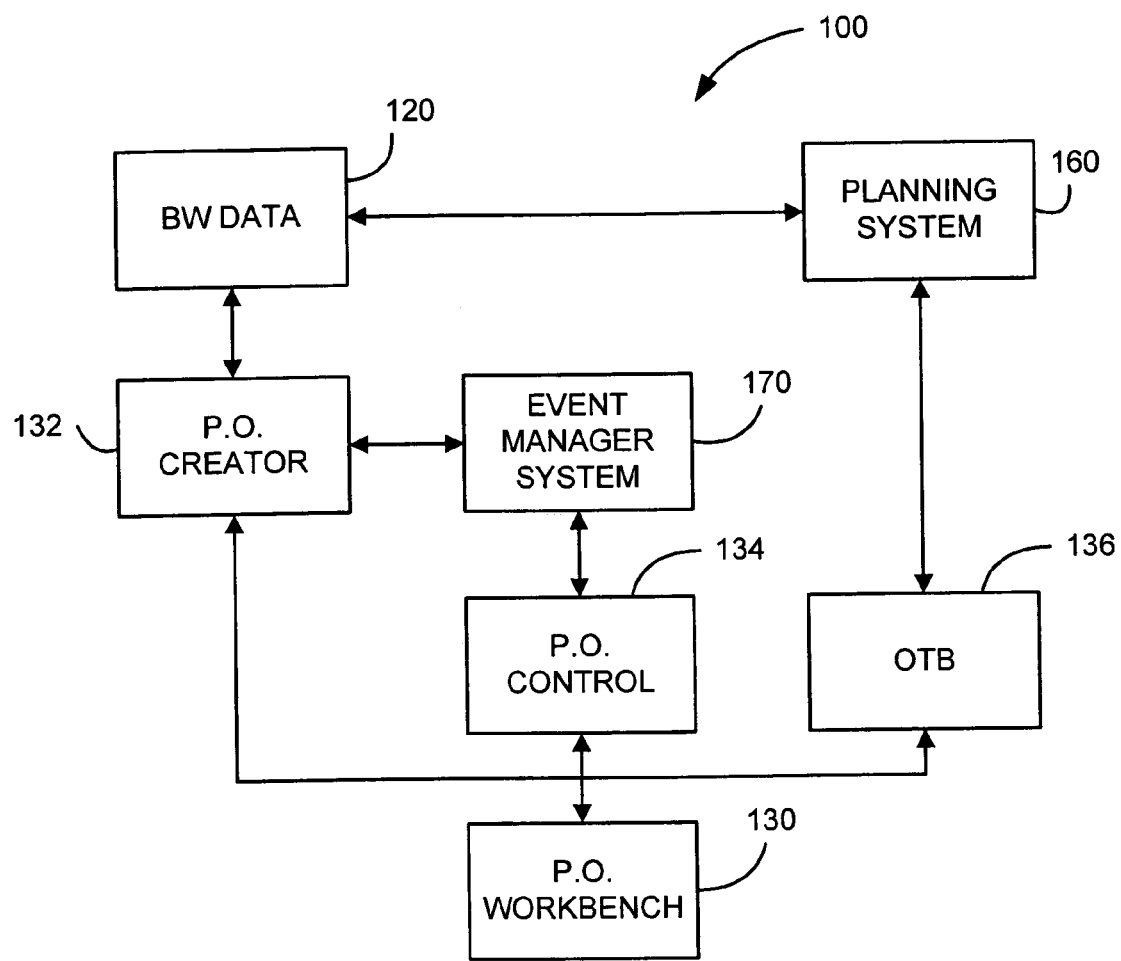
FIG. 1 is a general block diagram illustrating a system for processing data related to retail operations and planning, according to exemplary embodiment.

Referring now to FIG. 1, a general block diagram is shown illustrating an open-to-buy (OTB) system 100 for processing data related to retail operations and planning, according to exemplary embodiment. The OTB system 100 includes a data warehouse 120, a purchase order creator 132, an OTB control system 130 and a purchase order control system 134.

The OTB system 100 may be implemented as a workbench that may be a data processing system or software configured to control, display, interface with operators, or perform other operations to manage purchase orders. The OTB control system 130 is preferably implemented in an SAP-based workbench, interface, and architecture, but any other systems may be utilized.

The OTB system 100 may be implemented as a single system, a distributed system, or any combination thereof. The OTB system 100 may be implemented using a single computing system, a plurality of computing systems, software, hardware, or any other system or combination of systems to perform the functions described herein.

Data warehouse 120 is a data repository configured to receive, sort, and process information related to retail operations and planning. The data warehouse 120 may also be implemented as using a single or multiple systems. The data warehouse 120 may further include one or more functions associated with it to permit a user to efficiently organize and retrieve stored data. The OTB system 100 is sufficiently flexible to accommodate any of a variety of types of data warehouses 120, such as databases, for example.

In certain embodiments, the data warehouse 120 may be adapted to generate rules or checks to be used in the processing of purchase orders. In other embodiments, a planning system. 160 may be provided to generate planning data, rules, checks and budgets, and to provide such information to the data warehouse 120. In this regard, the rules or checks may include a planning data or planning budgets including budget buckets corresponding to delivery periods and order periods, for example. The planning data or budgets are provided by the data warehouse 120 to the OTB control system 130, which may be included in a purchase order workbench.

The purchase order workbench may be a data processing system configured to allow a user to create, monitor, and receive approval for purchase orders for obtaining products or other supplies from a supplier. According to an exemplary embodiment, the purchase order creator 132, the purchase order control system 134, and the open-to-buy control system 130 are included in the workbench.

Purchase order creator 132 may be any system or method for creating electronic purchase orders. An electronic purchase order may be any type of purchase order in an electronic format. Purchase order creator 132 may include one or more functions to facilitate creation of the electronic purchase order. For example, purchase order creator 132 may include an auto fill function to automatically populate an electronic purchase order with previously stored data. Additionally, purchase order creator 132 may include a user interface configured to receive and display purchase order information with a user. Upon creation of a purchase order, the purchase order creator 132 provides the purchase order information to the data warehouse 120 for use in future planning or recalculation of planning data or budget. The purchase order information is also provided to the purchase order control system 134. An event manager system 170 may be provided to facilitate communication between the purchase order creator 132 and the purchase order control system 134. The event manager system 170 may receive commands from the purchase order control system 134 to, for example, initiate the creation of a purchase order and may process that command by issuing a command to the purchase order creator 132.

Purchase order control system 134 may be any system for controlling and monitoring electronic purchase orders. Purchase order control system 134 includes one or more functions configured to allow a user to manipulate or receive information related to any existing purchase order. For example, a user may utilize purchase order control system 134 to retrieve information related to a specific purchase order and modify one or more attributes of the retrieved purchase order.

The purchase order control system 134 provides purchase order information to the OTB control system 130, which is configured to facilitate automated approval or rejection of electronic purchase orders including both procurement and budget check functions. The OTB control system 130 receives an electronic purchase order as input and applies one or more rules to the electronic purchase order to determine whether the electronic purchase order should be approved or rejected. The rules, or checks, are based on the planning budget which is based on the planning data received from the data warehouse 120. Planning budgets or buckets may be generated from the planning data at either the data warehouse 120, the OTB control system 130 or in another module lying between the two. According to an exemplary embodiment, the one or more rules includes at least one budget rule. A budget rule may define the amount of money that is available for a purchase order based on information contained in the purchase order. For example, a purchase order may include a time frame for the purchase order, and the rule may be used to define the amount of money that is available in that time frame. According to alternative embodiments, the one or more rules may also include rules directed to the timing during which purchase orders may be requested. In other embodiments, other types of rules may be incorporated into the OTB system 100. The OTB control system 130 will be further discussed below with reference to FIGS. 2-5.

According to alternative embodiments, a purchase order workbench may further include more, fewer, or different systems to facilitate creation, processing, and maintenance of purchase orders. Further, functions associated with one or more systems may alternatively be associated with one or more alternative systems. For example, purchase order creator 132 may be implemented as a component of purchase order control system 134.

Figure 2:
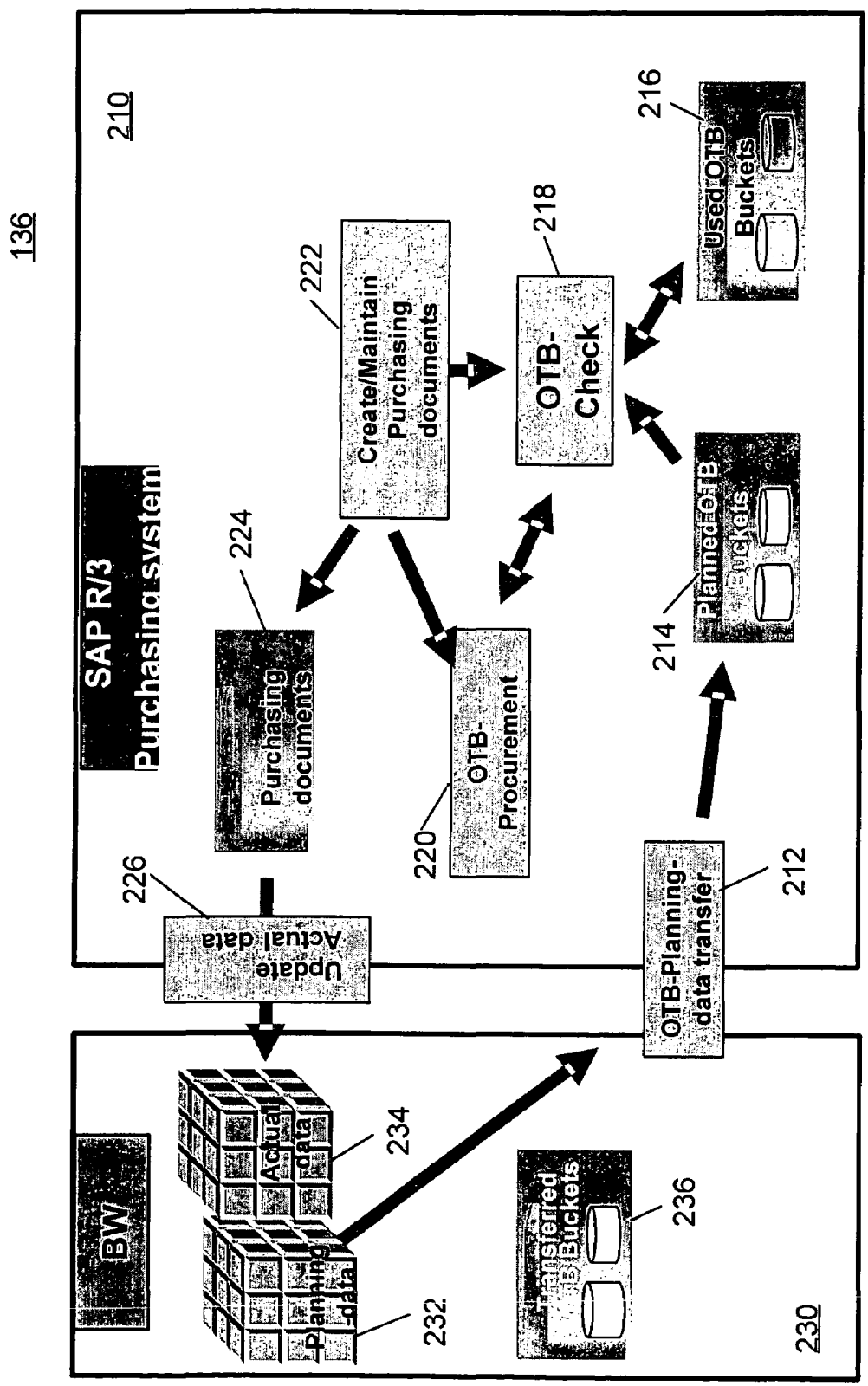
FIG. 2 is a block diagram illustrating an open to buy control system, according to an exemplary embodiment.

Referring now to FIG. 2, a block diagram illustrates open to buy system 136, according to an exemplary embodiment. Open to buy system 136 includes a plurality of components configured to implement one or more functions to facilitate acceptance or rejection of an electronic purchase order. Open to buy system 136 may be implemented as a purchase order processing system as will be further discussed below with reference to FIGS. 3-5.

Open to buy system 136 includes a front-end system 210 configured to provide an interface between one or more users and a back-end system 230, according to an exemplary embodiment. Although shown as separate components, front-end system 210 and back-end system 230 may alternatively be implemented as a single system. Yet further, open to buy system 136 may include a plurality of either front-end systems 210 or back-end systems 230. For example, open to buy system 136 may include a plurality of front-end systems 210 to allow multiple users in distributed locations to access uniform and synchronized information stored on backend system 230.

Further, each of the front-end system 210 and the back-end system 230 may further be configured to each include lower-level front-end and back-end systems. In this regard, one or both of the front-end system 210 and the back-end system 230 may include components which allow user interaction and components which interface with other modules.

Front-end system 210 is configured to allow one or more users to perform functions implemented using open to buy system 136. In the illustrated exemplary embodiment, the front-end system 210 includes a planning-data transfer module 212 adapted to receive data from the back-end system 230. The data received may include, for example, planned budget buckets, sales and budgeting information based on prior experience, current market conditions, and other factors. Additional detail relating to the planning data and its generation is provided below with reference to the description of the back-end system 230.

The planning-data transfer module 212 may generate a budget or a set of budget buckets, or budget portions, based on the planning data received from the back-end system 230. The budget information generated can then be stored in a planned budget module 214. In other embodiments, the planning-data transfer module 212 may receive and transfer raw planning data, and the planned budget module 214 may generated the budget information. In still further embodiments, the budget information may be generated within the back-end system 230 and forwarded to the planned budget module 214 through the planning data transfer module 212.

When a purchase order is received or submitted for processing, the front-end system 210 applies a set of checks or rules to determine whether the order should be processed as submitted. In this regard, the front-end system 210 is provided with an order check module 218. The order check module 218 accesses budget information from the planned budget module 214 to perform the necessary checks.

The order check module 218 may be configured to apply one or more open to buy rules to an electronic purchase order to determine whether the electronic purchase order should be accepted or rejected. A budget rule may be a type of open to buy rule. The order check module 218 may include a currency translation function configured to convert generic financial information to specific financial information relevant to the current user of front-end system 210. Status processing function 218 may be any function configured to determine whether no check was performed, a positive check result was received or a negative check result was received.

If the order check module 218 determines that the purchase order can be processed, the order is forwarded to a procurement module 220, which may communicate, directly or indirectly, over an interface with a user, such as a supplier or a vendor, to place the order. The procurement module 220 may be configured to receive and process information related to the creation, modification, or cancellation of an electronic purchase order.

If, on the other hand, the order check module 218 determines that the rules do not allow the purchase order to be processed as submitted, the order, the rules, the budget or a combination thereof may be modified to allow the processing of the purchase order. In this regard, the procurement module 220 may be configured to procure necessary additional budget (e.g., changing the value, delivery period, etc.) with the support of the purchasing documents creation module 222 or by requesting for a special release of additional budget that allows to overbook the corresponding budget bucket. If enough budget can be obtained within the procurement moduel 220, the order check module 218 can determine that the order can be processed. The front-end system 210 may be provided with a used budget module 216 to store budget information that is exhausted by existing purchase orders which may have been updated or revised by the order check module 218.

Once the order has been placed by the puchasing documents creation module 222, a confirmation may be received from the supplier or vendor. The information relating to the placement of the order may be generated by a purchasing documents creation module 222. In this regard, the information may include any revisions to the purchase order required by the order check module 218. The information generated by the purchasing documents creation module 222 may then be stored in a purchasing documents data store 224. In certain embodiments, an actual data transfer module 226 may be provided to supply the actual order and budget information to the back-end system for planning purposes.

According to alternative embodiments, front-end system 210 may include more, fewer, and/or different functions to provide a user interface and perform calculations related to purchase order processing. The described functions may be implemented using hardware, software, integrated circuits or any system configured to perform the functions described herein.

Back-end system 230 is configured to process data, store data, facilitate planning, provide reporting, and provide other functions associated with purchase order management using one or more functions and/or components. The back-end system 230 includes a planning data module 232 adapted to generate a merchandise ordering plan including all planned data (e.g., planned sales, planned margin, planned inventory, planned receipts and planned budget buckets). The merchandise ordering plan may include information relevant to, for example, order scheduling and budgeting. The planning data module 232 may be configured to receive information from at least an order forecasting system and an actual inventory reporting system 234. The order forecasting system (not shown) may include information from various sources, such as industry outlook reports, relating to expected market conditions, for example, The actual inventory reporting system 234 provides information to the planning data module 232 relevant to the actual inventory currently available, which may include expected deliveries. In this regard, the actual inventory reporting system 234 may include information received from the front-end system 210, through the actual data transfer module 226, relating to purchase orders already placed.

In certain embodiments, the planning data module 232 may be adapted to generate budget information. The budget information may be stored within the back-end system 230 in a transferred budget module 236. The transferred budget module 236 may be used to store planned budget buckets that have been released and/or transferred to the planned budget module 214. This may be used to reduce data traffic by requiring transfer of only the changed and new buckets from the planning data module 232 and the transferred budget module 235 to the planned budget module 214.

As noted above, the generation of the budget information from the planning information may be accomplished by either the planning-data module 232, the planning data transfer module 212 or the planned budget module 214 or the transferred budget module 236. In this regard, the budget information may include a budget allocation into a plurality of budget portions, or buckets, each corresponding to, for example, a delivery period, an order period, a merchandise category or a combination thereof.

According to alternative embodiments, backend system 230 may include more, fewer, and/or different functions to provide information and perform calculations related to purchase order processing.

Calculate open to buy rule transferred budget module 236 may be a function configured to generate one or more rules or functions to be applied to an electronic purchase order to determine whether the electronic purchase order should be accepted or rejected. The generation of the one or more rules and their application to electronic purchase orders are further discussed below with reference to FIG. 5.

Front-end system 210 and backend system 230 may be associated with one or more interface calls. An interface call is a message sent between front-end system 210 and back end system 230 or within either system. The interface call may be a request for information, a request for processing, and/or a communication of data. Each interface call may be associated with one or more functions or components within open to buy system 136.

A purchase order processing interface call is a communication from front-end system 210 to back-end system 230 communicating a request for the creation, modification, and/or cancellation of a purchase order. Modifications may include changes to amounts, changes to timing information, or any other modification. Based upon receipt of an interface call, the back-end system 230 is configured to create, modify, and/or cancel a purchase order.

A calculate open to buy rule interface call is a communication from back-end system 230 to front-end system 210 including an open to buy rule to be applied to electronic purchase orders. Based upon receipt of the open to buy rule, is the front-end system 210 can be configured to store the open to buy rule for application to future electronic purchase order requests in, for example, the order check module 218, which may further be configured to perform a validation check on the open to buy rule upon receipt as further described below with reference to FIG. 3.

An open to buy interface call is a communication from planned budget module 214 to the order check module 218 within the back-end system 230 including planning information to be used in the generation of open to buy rules. The planning budget information may include at least planned receipts, pending purchase orders, open purchase orders, order forecasts, receipts, and the change in end of planning period inventory. Interface call may further include a transfer from order check module 218 to the used budget module 216. The transferred information may include used budget information according to existing purchase orders.

Figure 3:
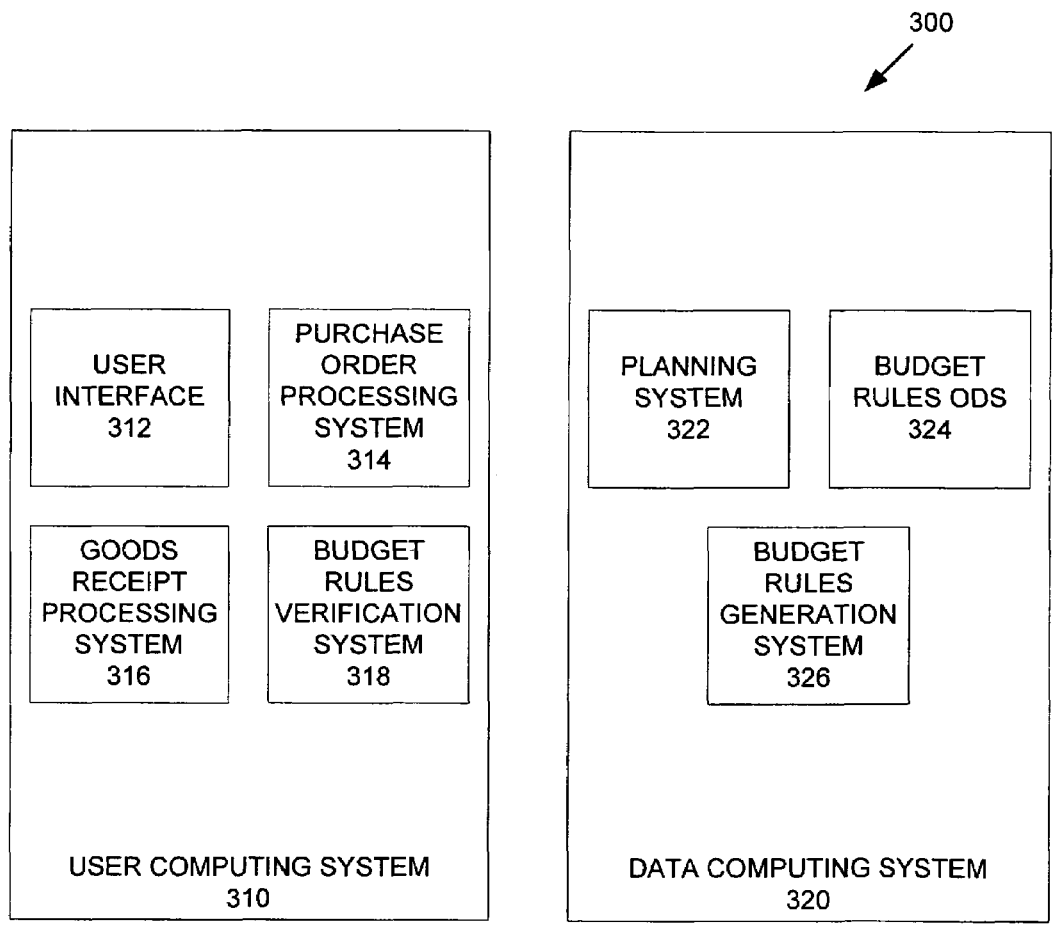
FIG. 3 is a general block diagram illustrating a purchase order processing system for processing electronic purchase orders, according to an exemplary embodiment.

Referring now to FIG. 3, a block diagram illustrates a purchase order processing system 300 for processing electronic purchase orders, according to an exemplary embodiment. Purchase order processing system 300 includes a user computing system 310 and a data processing system 320. Although shown as separate systems, system 310 and system 320 may be implemented as a single system. Further, functions associated with either system 310 or system 320 may alternatively be associated with the other of system 310 or system 320 or implemented within a stand-alone system.

According to an exemplary embodiment, system 300 may be implemented using a single computing system. Accordingly, system 300 may be any type of computing device, including work stations, laptops, notebooks, personal digital assistants (PDAs), or other equipment configured to receive input, store data in a memory, execute a series of instructions, and provide an output. System 300 may include a processor configured to execute a set instructions or computer program, such as an Intel® PENTIUM® processor sold by Intel Corp. of Santa Clara, Calif.

According to an alternative embodiment, system 300 may be implemented using computing systems in a networked environment. System 300 may include a first computing system implementing user computing system 310, a communication network, and a second computing system implementing data processing system 320. The first and second computing systems may be any type of computer system, such as the computer system described above. The first and second computing systems further include devices for communicating over the communication network.

According to an exemplary embodiment, the communication network may be the Internet. According to alternative embodiments, the communication network may be any other type of network, such as a virtual private network (VPN), an Ethernet, or a Netware network. Further, the network can include a configuration, such as, a wide area network (WAN) or a local area network (LAN).

According to an alternative embodiment, system 300 may include a plurality of user computing systems 310. For example, wherein system 300 is configured to operate in a networked environment, system 300 may include multiple user computing systems 310 configured to communicate with data processing system 320 over the communication network. System 300 may further include a plurality of data processing systems 320. The data processing systems 320 may be in communication with each other such that uniform rules are provided to the user computing system 310, further discussed below with reference to FIG. 5.

User computing system 310 may be any type of system configured to allow a user to enter and receive data related to electronic purchase order processing. For example, user computing system 310 may include a user interface configured to allow a user to input details related to a purchase order request. The details may include an item to be purchased, a number of items to be purchased, a total cost of items to be purchased, a time frame for delivery of items to be purchased, a payment due date for items to be purchased, etc. An exemplary user interface 312 is further described below.

User computing system 310 may further be configured to generate or receive an electronic purchase order. An electronic purchase order may be any type of purchase order stored in an electronic format.

User computing system 310 may further be configured to provide a user with the results of an electronic purchase order processing. For example, wherein an electronic purchase order is approved, user computing system 310 may be configured to display the approval to the user. User computing system 310 may further be configured to perform additional tasks related to the approval, such as, printing out the approved purchase order, forwarding the purchase order to the target supplier, updating pending order values, modifying rules, etc. These additional tasks are discussed in further detail below with reference to FIGS. 4 and 5.

Alternatively, wherein an electronic purchase order is rejected, user computing system 310 may be configured to display the rejection to a user and present the user with choices for remedial actions based on the rejection. For example, user computing system 310 may redisplay the rejected purchase order such that the user can modify one or more attributes of the rejected purchase order and resubmit the purchase order. User computing system 310 may further provide the user with feedback based on the rejection to advise the user in making amendments to the rejected purchase order. Exemplary advice can include limitations on the number of items that can be ordered, limitations on the total cost for the purchase order, limitations on the time frame for the order, description of other pending orders, etc.

Alternatively, user computing system 310 may be configured to initiate a procurement process based upon a rejection of the electronic purchase order.

Alternatively, where a purchase order is rejected, certain classes of users may be allowed to modify the budget rules such that the purchase order will be allowed. For example, a class of users may have approval to override normal budget rules in special circumstances, as will be further discussed below with reference to FIG. 5.

User computing system 310 includes a user interface 312, a purchase order approval system 314, a goods receipt logging system 316, and a budget rules verification system 318. User computing system 310 may further include additional, different, and/or fewer components and/or subsystems configured to facilitate purchase order processing.

User interface 312 may be any type of user interface configured to facilitate interaction between a user and user computing system 310 and/or data processing system 320. According to an exemplary embodiment, user interface 312 may include a plurality of selectable links configured to allow the user to access functionality provided by or through user computing system 310. User interface 312 further includes a plurality of input and output fields, the input fields configured to receive information from the user and the output fields configured to display information to the user.

Purchase order request processing system 314 is a system configured to receive purchase order information from a user through user interface 312 or another source, generate an electronic purchase order, apply at least one rule to the electronic purchase order, and provide an acceptance or rejection of the electronic purchase order to the user through user interface 312 based on the application of the rule. Accordingly, purchase order request processing system 314 may include one or more of purchase order creator 132, purchase order control system 134, and/or OTB control system 130, as discussed above with reference to FIG. 1. Budget rules and the process for accepting or rejecting an electronic purchase order are provided in more detail below with reference to FIG. 5.

Goods receipt processing system 316 is a system for processing information related to the receipt of goods for an existing electronic purchase order. According to an exemplary embodiment, goods receipt processing system 316 is configured to receive goods receipt information from a user through user interface 312 and provide the information to data processing system 320.

Budget rules verification system 318 is a system configured to receive at least one budget rule from data processing system 320 and perform a verification check on the at least one budget rules.

Data processing system 320 may be any type of system configured to generate and maintain budget rules and associated data. Data processing system 320 includes a planning system 322 and a budget rules generation system 326.

Planning system 322 is a system configured to generate and provide planning data to the budget rules verification system 318 of the user computing system 310. The planning data may be data that is generated by planning system 322 or data that is received as an input to planning system 322. For example, planning system 322 is configured to receive at least order forecast information and actual inventory information as inputs. The order forecast information is a projection predicting information related to orders to be placed in the future. The actual inventory information contains the actual inventory for the user for which the budget rules are being generated. The input information may be received in real time, periodically, based on events, and/or manually entered as needed. The planning data may be relevant to the generation of a planning budget, including buckets associated with each delivery period and order period. The planning budget and the buckets can be generated by the budget rules generating logic 326 using the planning data, as described below.

Planning system 322 may be further configured to generate budget rules reports. Budget rules reports contain a variety of information related to the creation and maintenance of the budget rules. Reports may be generated and customized for a variety of uses including strategic financial planning, store planning, merchandise planning, roll-out planning, etc. The planning system 322 may be adapted to re-calculate a planned budget either manually or automatically. The recalculation may be based on actual data received, for example, from previous planning cycles.

The planning system 322 may be configured to receive and store all of the information from various sources needed to generate the budget rules. The planning system 322 may further store additional information such as information used in generating budget rules reports.

Exemplary information stored in the planning system 322 may include planned receipts, pending purchase orders, open purchase orders, order forecast, receipts, and the difference between the planned inventory at the end of the planning period and the forecast inventory at the end of the planning period. The data may be stored and searchable according to a variety of key fields such as client name, week, month, delivery period, purchasing period, season type, season year, merchandise category, rollout date, season level, assortment level, organizational level, etc. Key fields may include any data category and can be used as a filtering criteria for the data. Thus, a customer or user may filter, sort, organize or retrieve the data based on any such key fields.

According to an exemplary embodiment, data stored in the planning system 322 may be stored in a planning currency. Advantageously, utilizing a planning currency allows budget rules to be created independent of volatility or differences in currency. By removing currency differences and volatility, budget rules may be more uniformly and effectively applied.

Budget rules generating logic 326 is configured to access data stored in the planning system 322 to generate at least one rule. According to an exemplary embodiment, the rule may be a budget rule. As noted above, the rule, or check, may be expressed in the form of one or more budget buckets. According to an exemplary embodiment, the at least one budget rule is a limit based on the amount of money available to purchase merchandise for a given time period. The creation of the at least one budget rule is further discussed below with reference to FIG. 4.

Data processing system 320 may further include more, fewer, or different configurations of subsystems and/or functions to perform the functions described herein. For example, data processing system 320 may include an inventory tracking system to facilitate generation of budget rules. Further, systems or function described as associated with a particular system or subsystem of system 100 may alternatively be associated with any other system within system 100. For example, budget rule calculations may alternatively be performed within data processing system 320.

Figure 4:
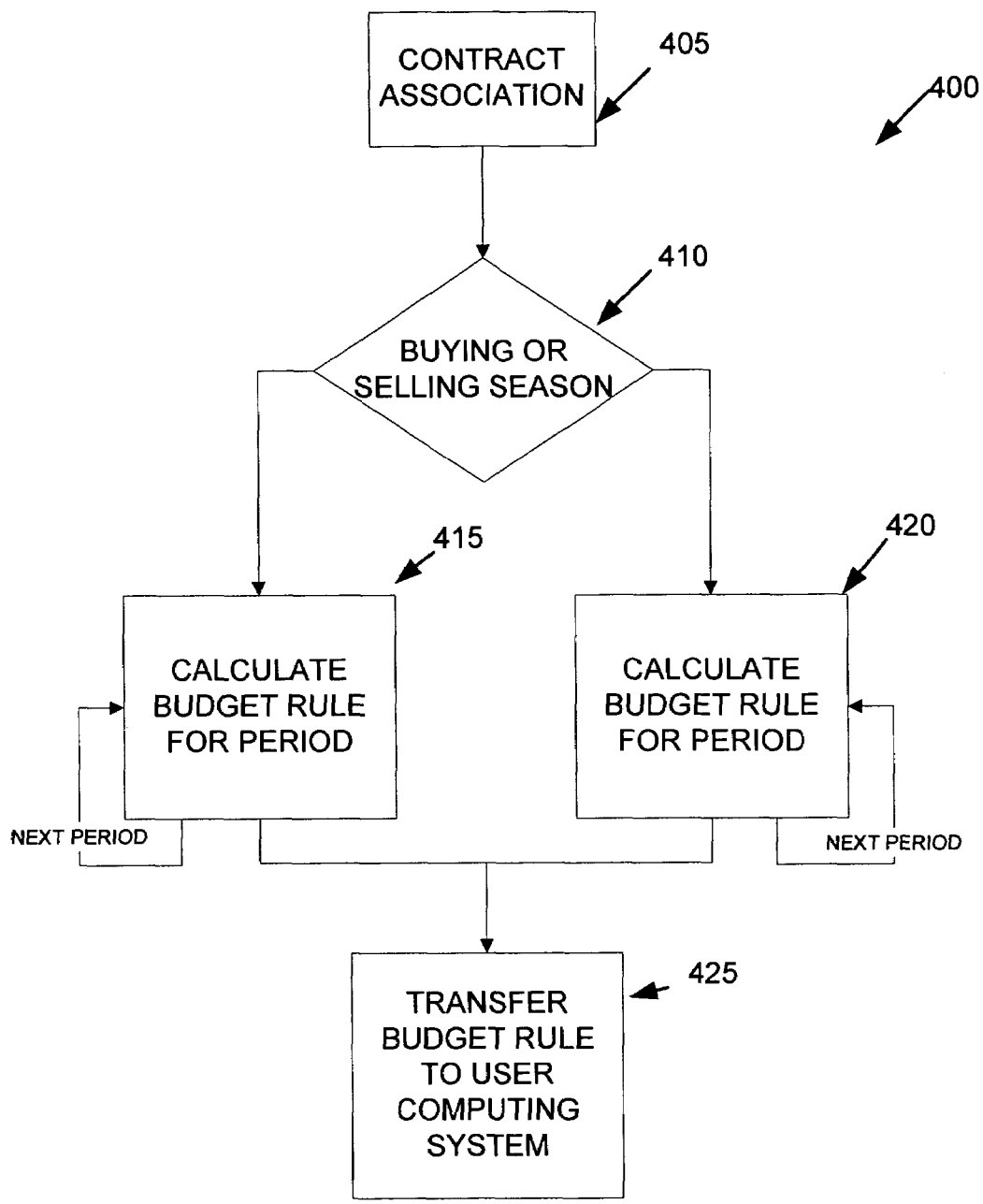
FIG. 4 is a flowchart illustrating a method for creating a budget rule, according to an exemplary embodiment.

Referring now to FIG. 4, a flowchart 400 is shown illustrating a method for creating a budget rule according to an exemplary embodiment. The budget rule may be created by budget rules generating logic 326 using data stored in the planning system 322 or from any other source.

In a step 405, a specific contract is selected to be associated with the generated set of business rules. The specific contract may be directed to a particular retailer, a particular supplier, a particular merchandise line, etc. The budget rule will be generated based upon data associated with the specific contract.

In a step 410, a determination is made whether the budget rule is to be created to apply to purchase orders received during a planning and buying phase or to purchase orders received during an in-season or selling phase. According to alternative embodiment, further alternatives may be provided to modify the scope and/or focus of the budget rule to be created. For example, budget rules may also be created to apply to specific stores, specific merchandise, etc.

In a step 415, a budget rule is calculated for a period within a planning period. A period may be a week, a month, a year or any other time period within a planning period. The period may correspond to a single delivery period, for example. Alternatively, budget rules may be calculated to apply to the entire period.

According to an exemplary embodiment, the budget rule is a limit equal to the values of planned receipts minus pending purchase orders minus open purchase orders minus forecasted purchase orders minus receipts. The values are generally obtained by accessing data stored in the planning system 322. The budget rule may be roughly equivalent to the inflows minus all outflows for a period. The amount remaining is the amount that is available to purchase merchandise for the sub-period.

Following calculation of the budget rule for the period, the period may be incremented to create a budget rule for the next period within the planning period and step 415 may be repeated. This iterative step may be repeated for each sub-period within the planning period to create a set of budget rules.

Alternatively, wherein the created budget rule is to be applied to purchase orders received during an in-season or selling phase in step 410, a budget rule is calculated for a period within a selling period in a step 420. The calculated budget rules is similar to the budget rule in step 415 in that the budget rule starts with planned receipts minus pending purchase orders minus open purchase orders minus forecasted orders minus receipts. However, a change in the end of period inventory is added to this calculation. The change in the end of period inventory is based on the planned end of planned inventory minus the forecasted end of planned inventory. The forecasted end of planned inventory is created based on actual inventory, received by planning system 322 as an input. The amount remaining is the amount that is available to purchase merchandise for the period.

Following generation of the one or more budget rules, the rule or set of rules may be transferred from data processing system 320 to user computing system 310 in a step 425. The budget rules may be transferred periodically, based upon receipt of a purchase order, based on a detected change in one or more budget rules, based on manual inputs, etc. In some embodiments, the budget rules for one or more delivery periods may be calculated even though some of the delivery periods may occur well into the future. As noted above, the system allows for recalculation of the planned budget either manually or automatically.

In the above described embodiment, the calculation or recalculation of the budget rules are allocated to delivery periods. In certain embodiments, as described below, a delivery period may correspond to one or more order periods. In this regard, in certain embodiments, the results of the calculation or recalculation may be allocated to the order periods corresponding to the delivery periods. Thus, a budget buckets may may form a budget rule at the intersection of a delivery period and an order period.

Figure 5:
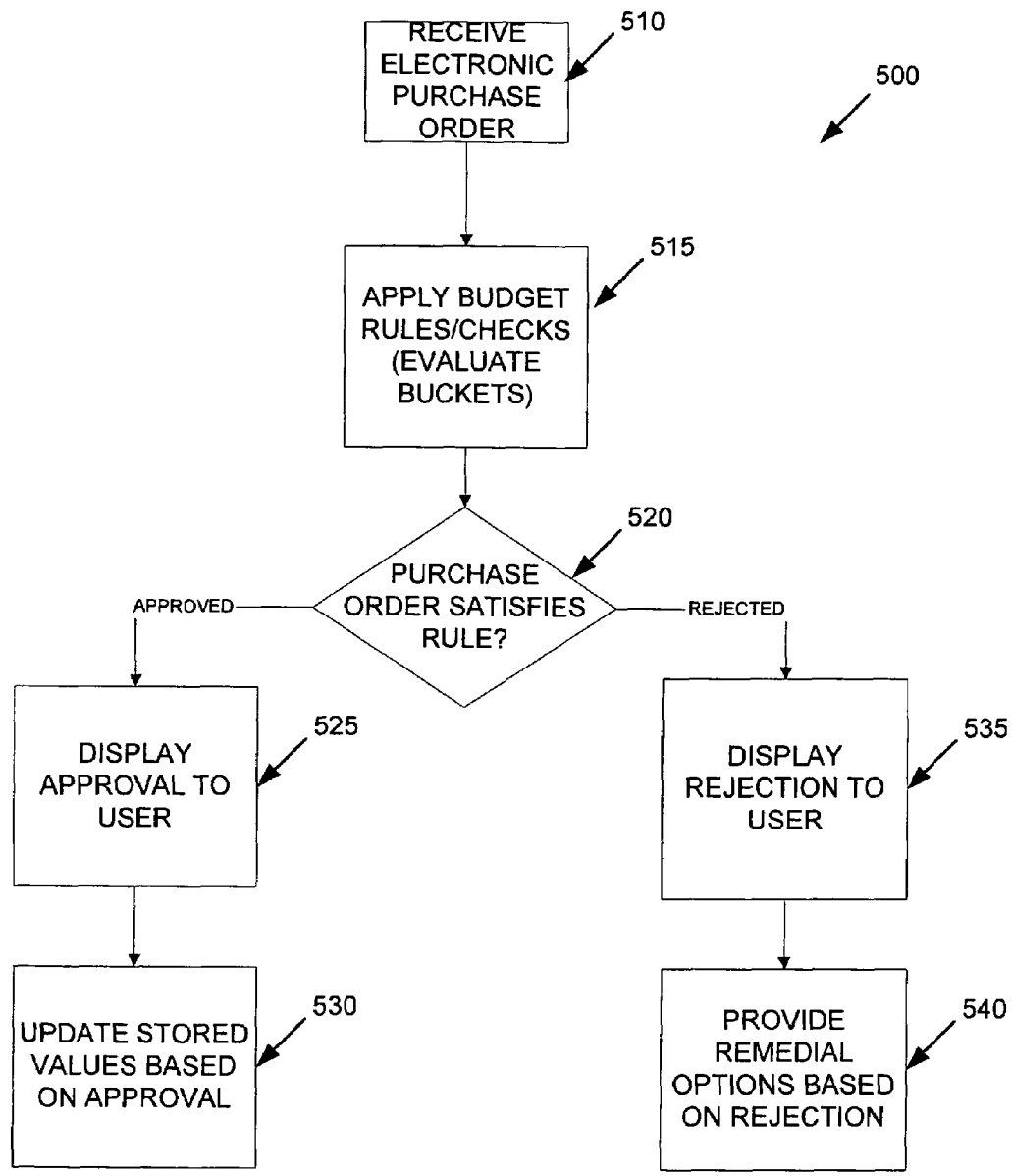
FIG. 5 is a flow chart illustrating a method for processing electronic purchase orders, according to an exemplary embodiment.

Referring now to FIG. 5, a flow chart 500 illustrating a method for processing electronic purchase orders is shown according to an exemplary embodiment. Electronic purchase orders are processed by applying one or more budget rules to the electronic purchase order to determine whether the purchase order is allowable according to the rules.

In a step 510, an electronic purchase order is received. The electronic purchase order for a sub-period may be received based upon user input through user interface 312 as described above. Alternatively, the electronic purchase order may be automatically generated. For example, the method for processing purchase orders may be used in conjunction with an inventory management system configured to automatically create purchase orders based on levels of inventory, changes in inventory, etc.

In a step 515, one or more budget rules are applied to the purchase order. Applying one or more budget rules to the purchase order may include subtracting the total cost under the purchase order from the amount of money available for purchasing to determine whether the total cost is less than the amount of money available. In this regard, the appropriate rule or check, such as the bucket corresponding to the current period, may be accessed. In the case of OTB allocation of planned budgets, the order period and the delivery period may be accessed. Following application of the one or more rules, a determination is made in step 520 whether the total cost of the purchase order is less than the amount of money available.

If the total cost of the purchase order is less than the amount of money available, the purchase order is approved in a step 525. Approval of the purchase order includes displaying an indicia to the user through user interface 222 to indicate that the purchase order is approved. Following approval of the purchase order, it may be necessary to update used budget module 216 in a step 530. In particular, the pending orders for the particular sub-period described in the purchase order are increased by an amount equal to the total cost of the purchase order.

Approval of the order may also include providing the user with the option to take one or more additional steps. For example, the user may be provided with an option to automatically forward the approved purchase order to the supplier for which the purchase was generated.

If the total cost of the purchase order is more than the amount of money available, the purchase order is rejected in a step 535. Rejection of the purchase order includes displaying an indicia to the user through user interface 222 to indicate that the purchase order is rejected and is generally accompanied for the reason for the rejection. For example, in some embodiments, the placement of a purchase order may require the existence of a budget bucket for the corresponding delivery period and order period. If no such bucket exists or the bucket has insufficient funds, the indicia may include a message such as "NO BUCKET FOR REQUESTED ORDER."

Following rejection of the purchase order, the user may be provided with one or more options based upon the rejection in a step 540. For example, the user may be provided with an opportunity to amend the purchase order such that the purchase order will be accepted with procurement module 220. Further, system 210 may be configured to provide the user with feedback indicating an allowable purchase order amount.

Alternatively, wherein a user has permission to modify the budget rules, the user may be provided with an option to modify one or more of the rules such that the purchase order will be allowed with procurement module 220. System 210 may further include constraints on a user's ability to modify the rules. For example, system 210 may include logic dictating that the user will only be allowed to modify rules for a first sub-period based upon a correlating change to a second sub-period. For example, a user may be able to increase the amount of money available in the first sub-period by decreasing the amount available in the second sub-period.

Purchase order processing may further include processing modifications and/or cancellations of existing purchase orders. Modifications that increase existing purchase order amounts may be processed as described above with the amount of the increase in the existing purchase order being treated as a new purchase order for that amount. Modifications to existing purchase order and/or cancellations of existing purchase orders may be processed without requiring approval or rejection. The budget rules may be modified to increase the amount of money available based upon a decrease or cancellation.

Although described in the context of purchase order processing for retail operations, system 210 may alternatively be applied to any system for processing electronic purchase orders by applying one or more rules to an electronic purchase order.

In addition to budgeting, purchase orders may be subject to scheduling requirements. In placing a purchase order for a given delivery period, the placement of the purchase order must be scheduled to ensure all items in the purchase order are received by the delivery period. In this regard, the purchase order may be placed well in advance of the delivery period. However, early placement of the purchase order can result in binding of the funds at an unnecessarily early stage. In this regard, methods and systems for scheduling of the purchase order in a more refined manner may be beneficial, as described below with reference to FIGS. 6-9.

FIG. 6 is a chart illustrating an exemplary purchase order for a specified delivery period. The purchase order 600 illustrated in FIG. 6 includes numerous items 610 for delivery in the August delivery period. The delivery period may refer to a period or a particular time within that period. For example, the purchase order for the August delivery period may include items which require delivery by the last day of August.

A quantity 620 is specified for each item 610 to be included in the purchase order, as well as the total cost for the item 610. Thus, the purchase order 600 specifically denotes the cost and composition of the purchase order to be received at the August delivery period.

Additionally, the purchase order 600 may specify a required lead time 640 for each item. Lead time 640 is the amount of time between the placement of the order and the delivery period required to, for example, guarantee timely delivery of the item. In other embodiments, lead time 640 may be indicative of a certain likelihood, such as 90-percent likelihood, of timely delivery.

The lead time 640 may be determined by several factors depending on the environment of the purchase order 600. For example, in a retail environment, the lead time 640 may be dependant on geographic location of the source relative to the destination, whereas in a specialty goods environment, the lead time 640 may be a function of the time required to customize or manufacture an item.

Although the lead times 640 illustrated in FIG. 6 are in a number of months, the actual lead time may be in any other units, such as days, weeks or other measure of time. In a particular embodiment, the lead time 640 in the purchase order is expressed in terms of a unit corresponding to order periods within a delivery period. Order periods are described below in greater detail. In such an embodiment, the expressed lead time 640 may reflect the actual lead time rounded up to the next higher order-period unit. Thus, for example, the lead time for Article 1 is expressed as 2 months. The actual lead time may be six weeks, which is rounded up to 2 months to correspond to an order-period unit of months. In other embodiments, the lead time expressed in the purchase order may remain as the actual lead time in any units. In this regard, an assignment to an order period for each item may be achieved based on the actual lead time. For example, if the lead time for a particular item is six weeks, a one-month lead time would be insufficient, but a two-month lead time would satisfy the requirement. Thus, the item may be assigned to an order period which occurs two months before the delivery period.

The lead times 640 may be used to sort and organize the purchase order 600, as shown in FIG. 7. Thus, it is possible to divide the purchase order into groups, or sub-orders, including items having same or similar lead times. In the illustrated example, the purchase order can be divided into six groups having lead times ranging from zero months to five months. In other embodiments, the orders may be grouped or divided into sub-orders based on additional factors. For example, a particular sub-order may be further divided based on a corresponding contract, vendor, or other factors. Similarly, sub-orders from different delivery periods may be grouped based on required order periods. For example, the sub-order for the August delivery period requiring the June order period may be grouped with a sub-order from the September delivery period also requiring the June order period.

Based on the lead times and the required delivery period, a required order placement schedule can be determined for each item. In particular, a latest order period is determined for each item to satisfy the lead time requirement for that item. In this regard, the purchase order 600 may be split among two or more order periods 650 corresponding to the delivery period. In the illustrated example, order periods occur monthly leading up to the month of the delivery period. As noted above, the delivery period may refer to a particular date corresponding to that period, such as the last day of the month. Similarly, the order period may correspond to a date by which an order for that order period must be placed, such as the fifteenth day of the month.

Thus, the purchase order for a particular delivery period can be split among two or more order periods. Each item in the purchase order can be assigned to one of the order periods such that the lead time requirement for each item is satisfied. At least some items are assigned to a latest order period determined for those items. In the example illustrated in FIG. 7, all items are assigned to a corresponding latest order period. In other embodiments, some items may be assigned to an order period that is earlier than the corresponding latest order period. For example, referring to FIG. 7, although June has been determined to be the latest order period for Article 1 to satisfy the lead time-requirement, Article 1 may be included in the sub-order for the April order period. This may be desirable in certain cased, such as if the item is in short supply or in heavy demand, for example.

As illustrated in FIG. 8, a budget 700 corresponding to the split purchase order may be calculated. The budget 700 for a delivery period may be split into allocations for each order period. The allocation for each order period includes costs associated with each item assigned to that order period. Thus, in the exemplary illustration of FIG. 8, the budget allocation for the March order period for the August delivery period is US$62,000 to reflect the costs associated with Articles 2, 7, 14 and 18. Similar budget allocations are reflected for all other order periods corresponding to the August delivery period.

Thus, as reflected by the budget allocations of FIG. 8, binding of at least some funds for the purchase order can be delayed. Rather than placing the entire purchase order to satisfy the lead time requirement of only a few items, the purchase order is split among two or more order periods to delay the binding of funds. Thus, in the example illustrated in FIGS. 6-8, rather than binding the entire US$250,000 in March, only US$62,000 is required at that time.

Figure 9:
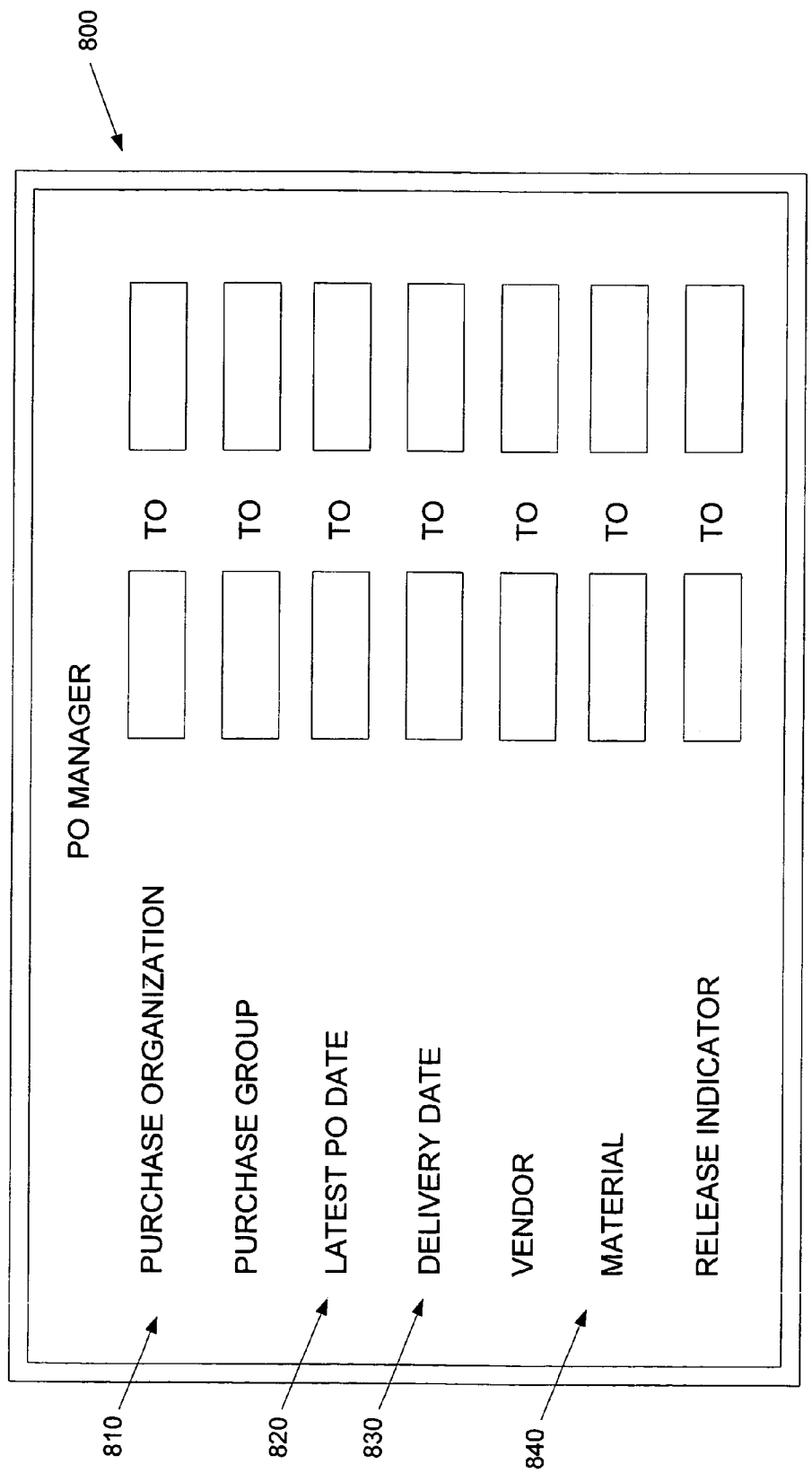
FIG. 9 illustrates an embodiment of a screen shot for an exemplary purchase order manager.

FIG. 9 illustrates an embodiment of a screen shot 800 of an exemplary purchase order manager. The screen shot 800 illustrates the information displayed to the user, including inputs required from the user, when the user desires to include an item in a purchase order. In this regard, the user may be provided with a form to be filled in relating to the item to be ordered. For example, the form may include inputs relating to identification 810 of the entity desiring to order the item. The entity may be a group, a department or an individual. Further, information relating to the item to be ordered may be included. For example, inputs 840 identifying the vendor and the product to be ordered may be required from the user.

Additionally, certain desired scheduling dates may be required as inputs from the user. For example, the form may include an input for the delivery date 830 by which the user desires to have delivery of the item take place. The form may also include information relating to the order period for the item. In this regard, the user may manually enter this information based on knowledge of the vendor and the product. Alternatively, the purchase order manager may supply this information based on the availability of lead-time information. Thus, based on the desired delivery date 830 and the identification of the item 840 provided by the user, the purchase order manager may determine the latest purchase order date 820, or order period, in which to include the item.

Figure 10:
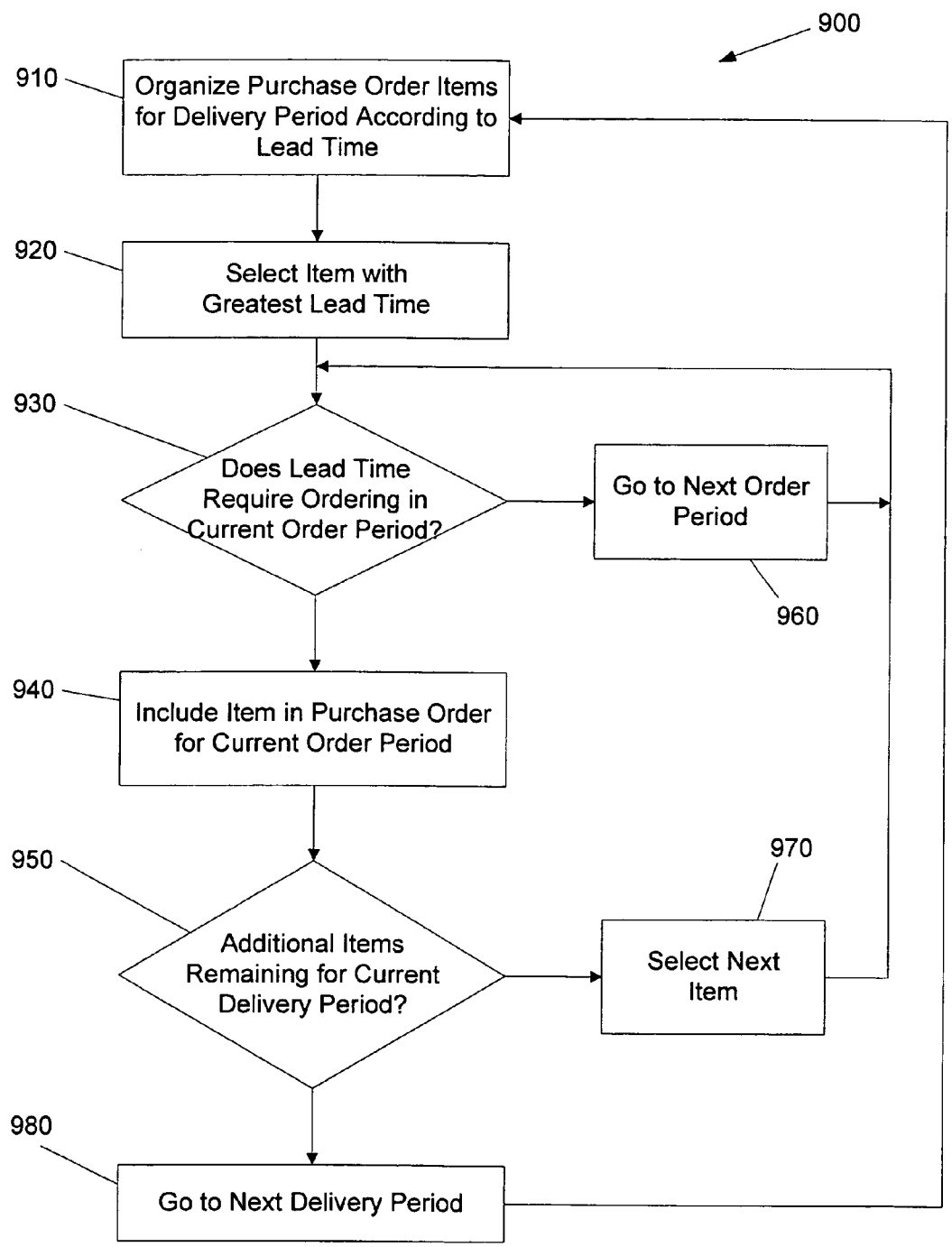
FIG. 10 is a flow chart illustrating an embodiment of a method of scheduling a purchase order.

FIG. 10 is a flow chart illustrating an embodiment of a process by which the scheduling of purchase orders may be achieved. The process 900 begins by organizing a purchase order for a given delivery period according to the lead times of items in the purchase order (block 910). As noted above, the organizing of the purchase order may include sorting the items in the purchase order in ascending order of required lead time.

At block 920, the item in the purchase order having the greatest lead time is selected, and a determination is made as to whether the item requires inclusion in the current order period (block 930). In this regard, the current order period may be set as the earliest order period corresponding to the delivery period and may be incremented once the sub-order for the current order period is set. As noted above, in some embodiments, the sorted purchase order may express the lead times for each item in terms of the required order period (e.g., rounding up the lead time to the next higher order-period unit). In other embodiments, the determination at block 930 may require a calculation to determine whether the lead time requirement for the item will be satisfied even if the item is not included in the sub-order for the current order period.

If the determination is made that the item selected at block 920 does not require inclusion in the current order period, the process 900 proceeds to block 960 and increments the order period. Because the item selected at block 920 had the greatest lead time of all items remaining in the purchase order, all other items in the purchase order can also be delayed until later order periods.

If the determination is made at block 930 that the item requires inclusion in the present order period, the sub-order for the current order period is updated to include the item therein (block 940). Next, at block 950, a determination is made as to whether additional items remain in the purchase order for the current delivery period. In this regard, items that have already been included in a sub-order for an order period are not considered. If the determination at block 950 is affirmative, the process 900 proceeds to block 970, and the remaining item with the greatest lead time is selected. The process then returns to block 930.

If the determination at block 950 is made that no additional items remain in the current delivery period, the process 900 concludes that all items in the purchase order for the current delivery period have been assigned to a sub-order for an order period corresponding to the delivery period. Accordingly, the process 900 proceeds to scheduling of a purchase order for the next delivery period (block 980) and returns to block 910.

As described above, the scheduling of a purchase order can be used to define or set a specific order period or date on which an order or a sub-order is to be placed. In other embodiments, the scheduling may be used in developing planning data or planning budgets. For example, the planned purchase orders based on the planning data may be scheduled based on known or estimated lead times. During recalculation of the planned budgets, for example, the scheduling may be modified based on updated planning data or budgets.

Many other changes and modifications may be made to the present invention without departing from the spirit thereof. The scope of these and other changes will become apparent from the appended claims.

What is claimed is:

1. A method of scheduling purchase orders, comprising:
defining a purchase order for a delivery period, said purchase order having two or more items, said delivery period corresponding to two or more order periods;
determining a latest order period for each item to satisfy a pre-determined lead time between order placement and delivery for delivery in said delivery period; and
assigning each item to one of said order periods, at least one item in said purchase order being assigned to a latest order period of said at least one item.

2. The method of claim 1, wherein said step of assigning includes assigning all items in said purchase order to corresponding latest order periods.

3. The method of claim 1, wherein said step of assigning includes assigning at least one item in said purchase order to an order period earlier than a corresponding latest order period.

4. The method of claim 1, further comprising:
calculating a budget for each of said order periods, said budget including costs associated with each item assigned to said order periods.

5. The method of claim 1, wherein said step of determining a latest order period includes sorting said two or more items according to corresponding latest order periods.

6. A program product for scheduling purchase orders, comprising machine-readable program code for causing, when executed, one or more machines to perform the following method steps:
defining a purchase order for a delivery period, said purchase order having two or more items, said delivery period corresponding to two or more order periods;
determining a latest order period for each item to satisfy a pre-determined lead time between order placement and delivery for delivery in said delivery period; and
assigning each item to one of said order periods, at least one in said purchase order being assigned to a latest order period of said at least one item.

7. The program product of claim 6, wherein said step of assigning includes assigning all items in said purchase order to corresponding latest order periods.

8. The program product of claim 6, wherein said step of assigning includes assigning at least one item in said purchase order to an order period earlier than a corresponding latest order period.

9. The program product of claim 6, further comprising machine-readable program code for causing, when executed, one or more machines to perform the following method step:
calculating a budget for each of said order periods, said budget including costs associated with each item assigned to said order periods.

10. The program product of claim 6, wherein said step of determining a latest order period includes sorting said two or more items according to corresponding latest order periods.

11. A system of scheduling purchase orders, comprising:
means for defining a purchase order for a delivery period, said purchase order having two or more items, said delivery period corresponding to two or more order periods;
means for determining a latest order period for each item to satisfy a pre-determined lead time between order placement and delivery for delivery in said delivery period; and
means for assigning each item to one of said order periods, at least one item in said purchase order being assigned to a latest order period of said at least one item.

12. The system of claim 11, wherein said step of assigning includes assigning all items in said purchase order to corresponding latest order periods.

13. The system of claim 11, wherein said step of assigning includes assigning at least one item in said purchase order to an order period earlier than a corresponding latest order period.

14. The system of claim 11, further comprising:
means for calculating a budget for each of said order periods, said budget including costs associated with each item assigned to said order periods.

15. The system of claim 11, wherein said step of determining a latest order period includes sorting said two or more items according to corresponding latest order periods.

16. A method of scheduling purchase orders, comprising:
a) receiving a purchase order for a delivery period, said delivery period corresponding to two or more order periods, said purchase order including two or more items, each item having a predetermined lead time between order placement and delivery;
b) determining whether an item has a lead time requiring inclusion of said item in a sub-order corresponding to current order period;
c) including said item in said sub-order corresponding to current order period when step c) results in an affirmative determination; and
d) repeating steps b) and c) for all items in said purchase order.

17. The method of claim 16, further comprising:
e) repeating steps b) through d) for all order periods corresponding to said delivery period.

* * * * *

UNITED STATES PATENT AND TRADEMARK OFFICE
CERTIFICATE OF CORRECTION

| | | |
|---|---|---|
| PATENT NO. | : 7,343,315 B2 | Page 1 of 1 |
| APPLICATION NO. | : 10/914614 | |
| DATED | : March 11, 2008 | |
| INVENTOR(S) | : Holger Wittmer and Andreas Freitag | |

It is certified that error appears in the above-identified patent and that said Letters Patent is hereby corrected as shown below:

Column 17:

Line 51; after "one" insert --item--

Signed and Sealed this

Eighth Day of July, 2008

JON W. DUDAS
*Director of the United States Patent and Trademark Office*